(12) United States Patent
Grochowski et al.

(10) Patent No.: US 7,340,643 B2
(45) Date of Patent: *Mar. 4, 2008

(54) REPLAY MECHANISM FOR CORRECTING SOFT ERRORS

(75) Inventors: Edward T. Grochowski, San Jose, CA (US); William Rash, Saratoga, CA (US); Nhon Quach, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 10/653,785

(22) Filed: Sep. 2, 2003

(65) Prior Publication Data

US 2004/0153763 A1   Aug. 5, 2004

Related U.S. Application Data

(63) Continuation of application No. 09/469,961, filed on Dec. 21, 1999, now Pat. No. 6,625,756, which is a continuation-in-part of application No. 08/994,503, filed on Dec. 19, 1997, now Pat. No. 6,047,370.

(51) Int. Cl.
*G06F 11/00* (2006.01)

(52) U.S. Cl. ............... 714/11; 714/10; 714/12; 712/229

(58) Field of Classification Search ............... 714/17, 714/16, 10–12, 37; 712/230, 219, 229, 43, 712/20–21

See application file for complete search history.

(56) References Cited

U.S. PATENT DOCUMENTS 4,453,215 A    6/1984  Reid
4,912,707 A    3/1990  Kogge et al.
5,012,403 A    4/1991  Keller et al.
5,185,871 A *  2/1993  Frey et al. .................. 712/205

(Continued)

FOREIGN PATENT DOCUMENTS

EP    0 315 303 A2    5/1989

(Continued)

OTHER PUBLICATIONS

Hennessey, John L. and David A. Patterson, Computer Organization & Design, Morgan Kaufman Publishers, Inc., 2nd Ed., 1997, p. G-8.*

(Continued)

*Primary Examiner*—Christopher McCarthy
(74) *Attorney, Agent, or Firm*—Blakely, Sokoloff, Taylor & Zafman LLP

(57) ABSTRACT

A processor is provided that implements a replay mechanism to recover from soft errors. The processor includes a protected execution unit, a check unit to detect errors in results generated by the protected execution unit, and a replay unit to track selected instructions issued to the protected execution unit. When the check unit detects an error, it triggers the replay unit to reissue the selected instructions to the protected execution unit. One embodiment of the replay unit provides an instruction buffer that includes pointers to track issue and retirement status of in-flight instructions. When the check unit indicates an error, the replay unit resets a pointer to reissue the instruction for which the error was detected.

5 Claims, 7 Drawing Sheets

U.S. PATENT DOCUMENTS

| | | | |
|---|---|---|---|
| 5,247,628 A | 9/1993 | Grohoski | |
| 5,321,698 A | 6/1994 | Nguyen et al. | |
| 5,428,807 A | 6/1995 | McKeen et al. | |
| 5,475,856 A | 12/1995 | Kogge | |
| 5,504,859 A | 4/1996 | Gustafson et al. | |
| 5,530,802 A | 6/1996 | Fuchs et al. | |
| 5,530,804 A | 6/1996 | Edgington et al. | |
| 5,535,410 A | 7/1996 | Watanabe et al. | |
| 5,561,775 A | 10/1996 | Kurosawa et al. | |
| 5,604,753 A * | 2/1997 | Bauer et al. | 714/763 |
| 5,630,047 A | 5/1997 | Wang | |
| 5,659,721 A | 8/1997 | Shen et al. | |
| 5,664,214 A | 9/1997 | Taylor et al. | |
| 5,748,873 A | 5/1998 | Ohguro et al. | |
| 5,751,985 A | 5/1998 | Shen et al. | |
| 5,764,971 A | 6/1998 | Shang et al. | |
| 5,765,208 A | 6/1998 | Nelson et al. | |
| 5,784,587 A | 7/1998 | Lotz et al. | |
| 5,787,474 A | 7/1998 | Pflum | |
| 5,903,771 A | 5/1999 | Sgro et al. | |
| 5,966,544 A * | 10/1999 | Sager | 712/32 |
| 6,047,370 A * | 4/2000 | Grochowski | 712/219 |
| 6,058,491 A * | 5/2000 | Bossen et al. | 714/15 |
| 6,076,153 A * | 6/2000 | Grochowski et al. | 712/23 |
| 6,148,348 A * | 11/2000 | Garnett et al. | 710/14 |
| 6,163,838 A * | 12/2000 | Merchant et al. | 712/219 |
| 6,199,171 B1 * | 3/2001 | Bossen et al. | 714/2 |
| 6,205,542 B1 * | 3/2001 | Grochowski et al. | 712/219 |
| 6,212,626 B1 * | 4/2001 | Merchant et al. | 712/218 |
| 6,223,304 B1 * | 4/2001 | Kling et al. | 714/12 |
| 6,279,119 B1 * | 8/2001 | Bissett et al. | 714/12 |
| 6,385,715 B1 * | 5/2002 | Merchant et al. | 712/219 |
| 6,393,582 B1 * | 5/2002 | Klecka et al. | 714/11 |
| 6,412,067 B1 * | 6/2002 | Ramirez et al. | 712/245 |
| 6,615,366 B1 * | 9/2003 | Grochowski et al. | 714/10 |
| 6,625,749 B1 * | 9/2003 | Quach | 714/10 |
| 6,625,756 B1 * | 9/2003 | Grochowski et al. | 714/17 |
| 6,629,271 B1 * | 9/2003 | Lee et al. | 714/49 |
| 6,640,313 B1 * | 10/2003 | Quach | 714/10 |
| 6,708,284 B2 * | 3/2004 | Smith | 714/10 |
| 6,745,346 B2 * | 6/2004 | Quach et al. | 714/42 |
| 6,763,481 B2 * | 7/2004 | Yamane | 714/11 |
| 6,772,368 B2 * | 8/2004 | Dhong et al. | 714/11 |
| 6,880,069 B1 * | 4/2005 | Carmean et al. | 712/227 |
| 6,928,583 B2 * | 8/2005 | Griffin et al. | 714/11 |
| 7,047,341 B2 * | 5/2006 | Jung | 710/305 |
| 7,055,060 B2 * | 5/2006 | Nguyen et al. | 714/11 |
| 7,085,959 B2 * | 8/2006 | Safford | 714/11 |
| 2002/0152418 A1 * | 10/2002 | Griffin et al. | 714/11 |
| 2004/0019771 A1 * | 1/2004 | Quach | 712/229 |
| 2004/0064756 A1 * | 4/2004 | Kadambi | 714/17 |
| 2004/0078651 A1 * | 4/2004 | Safford et al. | 714/11 |
| 2004/0123201 A1 * | 6/2004 | Nguyen et al. | 714/736 |
| 2004/0153763 A1 * | 8/2004 | Grochowski et al. | 714/17 |
| 2005/0015659 A1 * | 1/2005 | Pomaranski et al. | 714/11 |
| 2005/0240810 A1 * | 10/2005 | Safford et al. | 714/10 |
| 2005/0240811 A1 * | 10/2005 | Safford et al. | 714/11 |

FOREIGN PATENT DOCUMENTS

EP        0 411 805 A3    2/1991

OTHER PUBLICATIONS

Anthony Marsala & Basel Kanawati; PowerPC Processors; System Theory 1994; Proceedings of the 26th Southwestern Symposium. pp. 550-556; Athens, OH USA; ISBN:0-8186-5320; IEEE Catalog #94TH0599-1.

1984 Data Book; Rockwell International, Semiconductor Products Division; Order No. 1, Oct. 1983; pp. 3-1-3-22.

Hennessy, John L., Patterson, David A., "Computer Organization and Design", 1998 Morgan Kaufmann Publishers, Inc., p. G-8.

International Search Report, PCT/US98/27331, International filing date Dec. 18, 1999, mailing date Apr. 21, 1999 ( 4 pp.).

* cited by examiner

REPLAY MECHANISM FOR CORRECTING SOFT ERRORS

RELATED PATENT APPLICATIONS

This non-provisional United States (U.S.) patent application claims the benefit of and is a continuation application of U.S. patent application Ser. No. 09/469,961 filed on Dec. 21, 1999 by inventors Edward T. Grochowski, et al., entitled "REPLAY MECHANISM FOR CORRECTING SOFT ERRORS", now U.S. Pat. No. 6,625,756; which claims the benefit of and is a continuation-in-part of U.S. application Ser. No. 08/994,503, entitled "PROCESSOR PIPELINE INCLUDING BACKEND REPLAY", which was filed on Dec. 19, 1997, now U.S. Pat. No. 6,047,370.

BACKGROUND OF THE INVENTION

1. Technical Field

The present invention relates to microprocessors and, in particular, to microprocessors capable of operating in high-reliability modes.

2. Background Art

Soft errors arise when alpha particles or cosmic rays strike an integrated circuit and alter the charges stored on the voltage nodes of the circuit. If the charge alteration is sufficiently large, a voltage representing one logic state may be changed to a voltage representing a different logic state. For example, a voltage representing a logic true state may be altered to a voltage representing a logic false state, and any data that incorporates the logic state will be corrupted.

Soft error rates (SERs) for integrated circuits, such as microprocessors ("processors"), increase as semiconductor process technologies scale to smaller dimensions and lower operating voltages. Smaller process dimensions allow greater device densities to be achieved on the processor die. This increases the likelihood that an alpha particle or cosmic ray will strike one of the processor's voltage nodes. Lower operating voltages mean that smaller charge disruptions are sufficient to alter the logic state represented by the node voltages. Both trends point to higher SERs in the future. Soft errors may be corrected in a processor if they are detected before any corrupted results are used to update the processor's architectural state.

Processors frequently employ parity-based mechanisms to detect data corruption due to soft errors. A parity bit is associated with each block of data when it is stored. The bit is set to one or zero according to whether there is an odd or even number of ones in the data block. When the data block is read out of its storage location, the number of ones in the block is compared with the parity bit. A discrepancy between the values indicates that the data block has been corrupted. Agreement between the values indicates that either no corruption has occurred or two (or four . . . ) bits have been altered. Since the latter events have very low probabilities of occurrence, parity provides a reliable indication of whether data corruption has occurred. Error correcting codes (ECCs) are parity-based mechanisms that track additional information for each data block. The additional information allows the corrupted bit(s) to be identified and corrected.

Parity/ECC mechanisms have been applied extensively to caches, memories, and similar data storage arrays. These structures have relatively high densities of data storing nodes and are susceptible to soft errors even at current device dimensions. Their localized array structures make it relatively easy to implement parity/ECC mechanisms. The remaining circuitry on a processor includes data paths, control logic, execution logic and registers ("execution core"). The varied structures of these circuits and their distribution over the processor die make it more difficult to apply parity/ECC mechanisms.

One approach to detecting soft errors in an execution core is to process instructions on duplicate execution cores and compare results determined by each on an instruction by instruction basis ("redundant execution"). For example, one computer system includes two separate processors that may be booted to run in a Functional Redundant Check unit ("FRC") mode. In FRC mode, the processors execute identical code segments and compare their results on an instruction by instruction basis to determine whether an error has occurred. This dual processor approach is costly (in terms of silicon). In addition, the inter-processor signaling through which results are compared is too slow to detect corrupted data before it updates the processors' architectural states. Consequently, this approach is not suitable for correcting detected soft errors.

Another computer system provides execution redundancy using dual execution cores on a single processor chip. This approach eliminates the need for inter-processor signaling, and detected soft errors can usually be corrected. However, the processor employs an on-chip microcode to correct soft errors. This approach consumes significant processor area to store the microcode and it is a relatively slow correction mechanism.

The present invention addresses these and other deficiencies of available high reliability computer systems.

SUMMARY OF THE INVENTION

The present invention provides a mechanism for correcting soft errors in high reliability processors.

In accordance with the present invention, a processor includes a protected execution unit, a check unit to detect errors in results generated by the protected execution unit, and a replay unit to track selected instructions issued to the protected execution unit. When the check unit detects an error, it triggers the replay unit to reissue the selected instructions to the protected execution unit.

For one embodiment of the invention, the protected execution unit includes first and second execution units that provide redundant execution results to detect soft errors. For another embodiment of the invention, the protected execution unit includes parity protected storage structures to detect soft errors. For yet another embodiment of the invention, the replay unit provides an instruction buffer that includes pointers to track issue and retirement status of in-flight instructions. When the check unit indicates an error, the replay unit resets a pointer to reissue the instruction for which the error was detected.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a hardware mechanism for correcting soft errors in a computer system that is designed to execute instructions with high reliability. High reliability code execution is warranted for certain computer systems that must be available with minimal interruptions in service. When soft errors arise in one of these computer systems as it executes code associated with the operating system kernel or code that operates directly on the platform hardware, the entire computer system can crash. Such errors are to be avoided at all costs. The present invention allows soft errors to be corrected quickly, before the errors have a chance to corrupt architectural data.

Embodiments of the present invention employ a protected execution unit, which processes instructions in a manner that facilitates the detection of soft errors. A check unit monitors the protected execution unit for an indication that a soft error has occurred. The replay unit tracks selected instructions that are in-flight in the protected execution unit. When the check unit indicates that a soft error has occurred, the replay unit reissues the selected in-flight instructions for re-execution.

Figure 1:
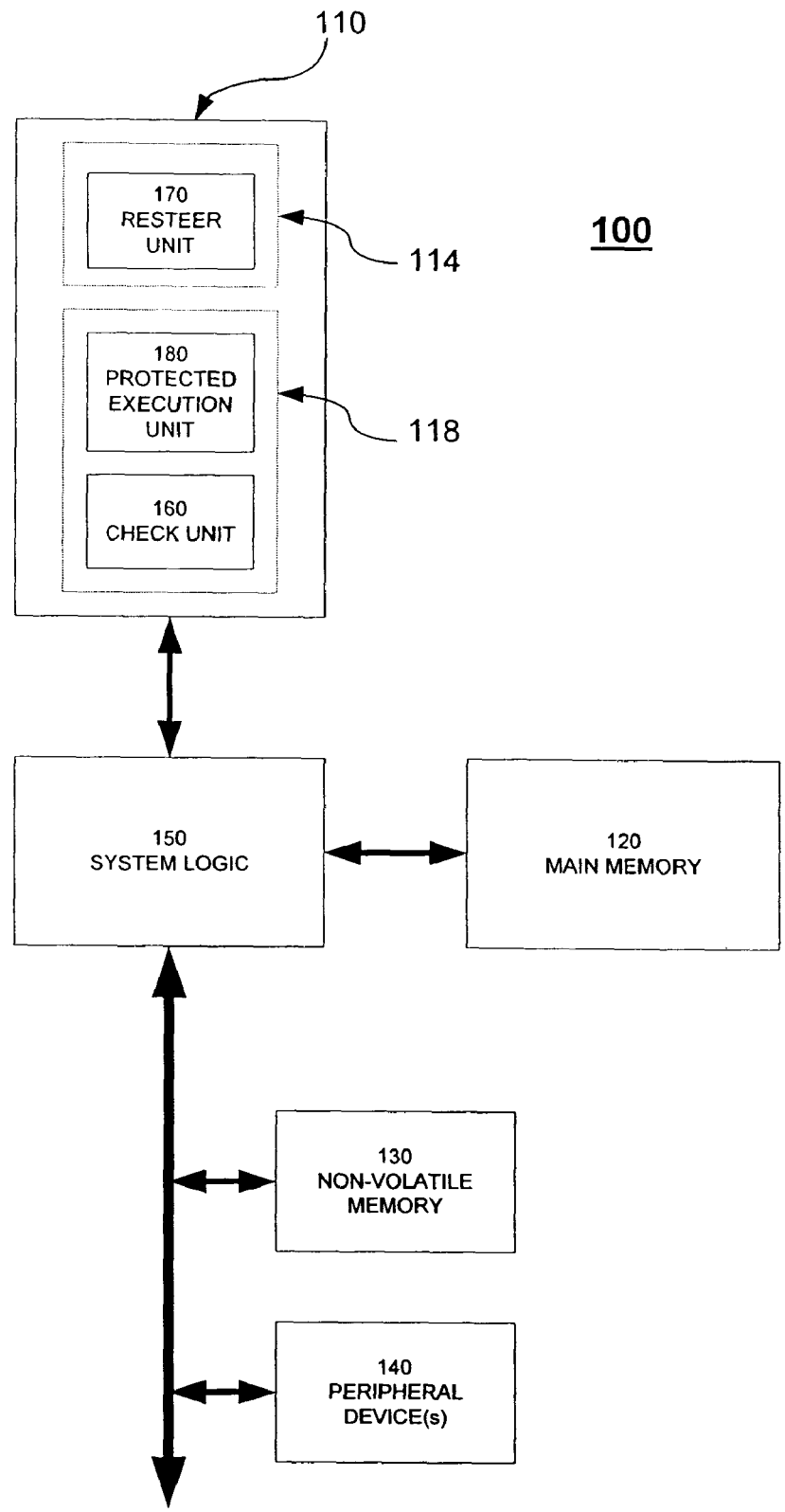
FIG. 1 is a block diagram of a computer system that includes a processor in accordance with the present invention.

FIG. 1 is a block diagram of one embodiment of a computer system 100 in which the present invention may be implemented. Computer system 100 includes one or more processors 110, a main memory 120, a non-volatile memory 130, various peripheral devices 140, and system logic 150. System logic 150 controls data transfers among processor(s) 110, main memory 120, non-volatile memory 130, and peripheral devices 140. Computer system 100 is provided to illustrate features of the present invention. The particular configuration shown is not necessary to implement the present invention.

Processor 110 implements an instruction execution pipeline comprising a front end 114 and a back end 118. Front end 114 retrieves instructions and issues them to back end 118 for execution. For the disclosed embodiment of processor 110, front end 114 includes a replay unit 170, and back end 118 includes a protected execution unit 180 and a check unit 160. Front end 114 may retrieve instructions for processing from main memory 120 or non-volatile memory 130.

Protected execution unit 180 includes circuitry to execute instructions in a manner that facilitates detection of soft errors. This in turn allows code to be executed with high reliability Check unit 160 monitors protected execution unit 180 to determine whether an error has occurred. For one embodiment of processor 110, protected execution unit 180 implements redundant execution units, and check unit 160 compares results from redundantly executed instructions to determine whether a soft error has occurred. For another embodiment of processor 110, protected execution unit 180 includes parity-protected storage structures, and check unit 160 monitors data from these structures for parity errors. The present invention does not depend on the particular mechanism through which protected execution unit 180 supports high reliability execution.

Replay unit 170 tracks selected instructions in protected execution unit 180 until they are retired. When an instruction is retired, results generated by the instruction update the architectural state of the processor ("processor state"). For this reason, it is important to detect and correct soft errors before the instructions that are affected by the soft error retire. Since soft errors are a product of transient phenomena (cosmic rays, alpha particles), data corruption attributable to these errors can frequently be eliminated by re-executing instructions that are affected by the soft error. For example, soft errors that corrupt data in execution, control, and delivery circuits are unlikely to recur when instructions are re-executed. These soft errors may be addressed by re-executing selected instructions beginning with the instruction for which the soft error was first detected. Soft errors may also corrupt data in various storage structures associated with the execution resources. Re-executing instructions that merely retrieve corrupted data does not eliminate the problem. However, the corrupted data may be restored by various hardware and software mechanisms, e.g. ECC hardware or firmware. These soft errors may be addressed by re-executing the instructions once the data has been recovered data.

In the following discussion, "instruction" refers to any of the various forms in which instructions are handled by the processor's instruction execution pipeline. These forms include individual instructions or collections of instructions. The latter includes macro-instructions and instruction bundles. For various processor embodiments, instructions or instructions bundles may be decoded into "µops" or instruction syllables, respectively, before they are delivered to the execution units. Where necessary to avoid confusion, the term, "µop", is used to identify the individual components of an instruction that are directed to different types of execution units.

Figure 2B:
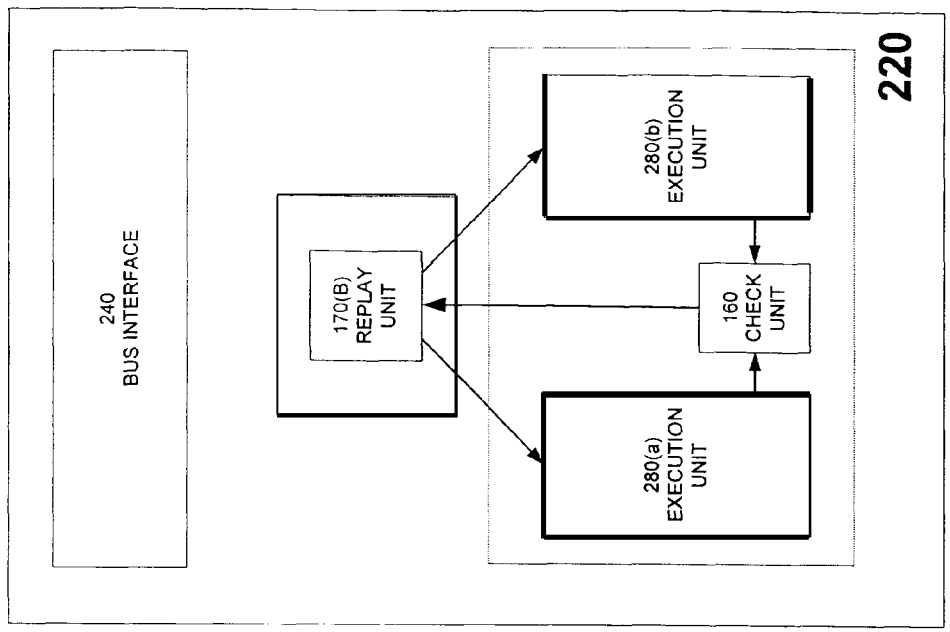
FIGS. 2A-2C are block diagrams of various embodiments of the processor of FIG. 1 representing different types of protected execution units.
Figure 2A:
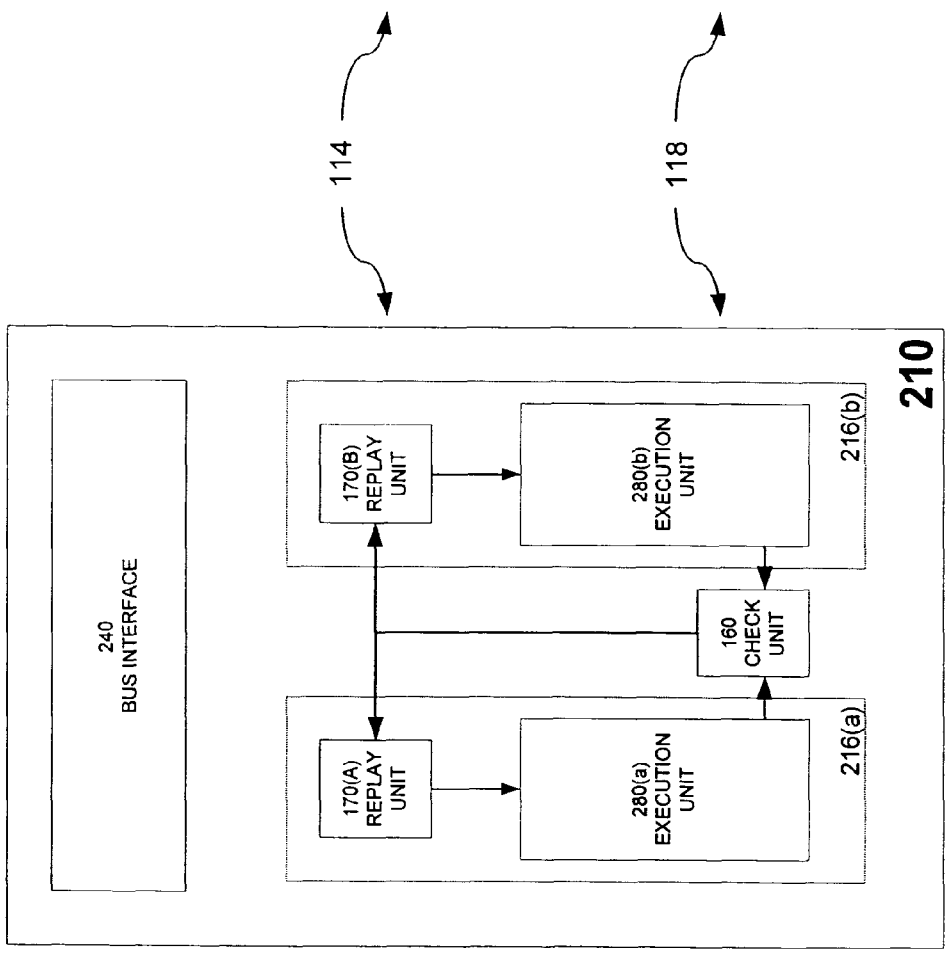

FIG. 2A is a block diagram of one embodiment of processor 110 (processor 210) that supports soft error detection through redundant execution clusters. Processor 210 includes a pair of execution cores 216(a), 216(b) (generically, execution core 216), which are operated in lock step. Each execution core 216 includes a replay unit 170 (170(a) and 170(b)) and an execution unit 280 (280(a) and 280(b)). Identical instructions are provided to replay unit 170 by, e.g. a fetch unit (not shown). Each replay unit 170 directs the instruction to its associated execution unit 280 and monitors the issued instructions until they retire.

Results generated by execution units 280 are compared by check unit 160 and a discrepancy indicates a soft error may have occurred. When a discrepancy is detected, check unit 160 signals an error to replay unit 170, which reissues selected instructions. If the soft error was transient, e.g. a bit flipped in a logic or control circuit, the discrepancy disappears when the instructions are re-executed. If the discrepancy is not eliminated by re-execution, processor 210 may invoke a back-up recovery mechanism. The discrepancy may persist, for example, if data in a register file or data cache of processor 210 was corrupted by a soft error. For one embodiment of processor 210, check unit 160 invokes a firmware error recovery routine in non-volatile memory 130 if re-executing instructions a selected number of times fails to eliminate the discrepancy.

FIG. 2B represents another embodiment of processor 110 (processor 220) that supports soft error detection through redundant execution. For the disclosed embodiment of processor 220 only duplicates portions of the processor hardware in back end 118. Protected execution unit 180 includes first and second execution units 280(*a*) and 280(*b*). A single replay unit 170 provides identical instructions to execution units 280 and tracks them until they retire. As for the case of processor 210, processor 220 provides a level of redundant execution that allows soft errors to be detected more easily. However, only the back end stages of processor 220 are duplicated. This reduces the hardware cost for processor 220, but processor 220 may be more susceptible to soft errors in front end 114. As in the embodiment of FIG. 2A, check unit 160 monitors execution units 280 and signals replay unit 170 when a discrepancy is detected. Processor 220 may also implement a back-up recovery mechanism for those cases in which re-execution does not eliminate the discrepancy.

Figure 2C:
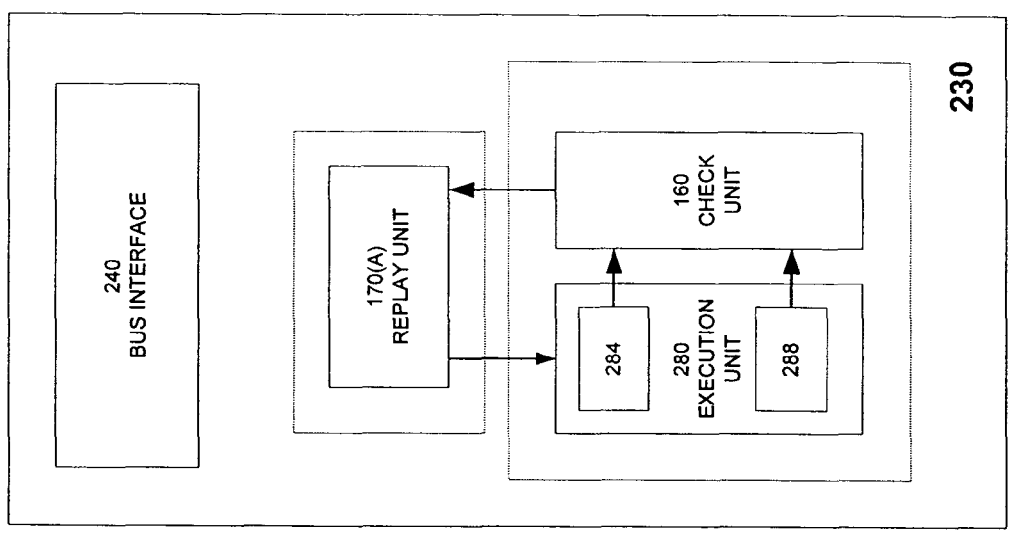

FIG. 2C is a block diagram representing yet another embodiment of processor 110 (processor 230). Processor 230 supports soft error detection through parity protected storage structures. For the disclosed embodiment of processor 230, protected execution unit 180 comprises execution unit 280 having a parity-protected register file 284 and cache 288. In addition, various latches and other storage structures in the control and execution circuitry of execution unit 280 may incorporate parity protection. Check unit 160 monitors the parity protected storage structures and signals when a parity error is detected. For example, the parity of data blocks in, e.g., register file 284 or cache 288 is indicated through a corresponding parity bit. When a data block is accessed, the parity bit may be compared with a parity value calculated for the data block. A discrepancy between the stored and calculated parity values indicates a soft error corrupted the data after it was stored. For one embodiment of processor 230, check unit 160 includes hardware to implement the parity check.

FIGS. 2A-2C represent a sample of the different types of protection a processor may employ to support high reliability execution. Protected execution unit 180 may employ other mechanisms to support high reliability execution. In the following discussion, the present invention is illustrated in greater detail, using an embodiment of processor 210. Persons skilled in the art of processor design will appreciate the modifications necessary to implement the replay unit 170 for other embodiments of processor 110.

Figure 3:
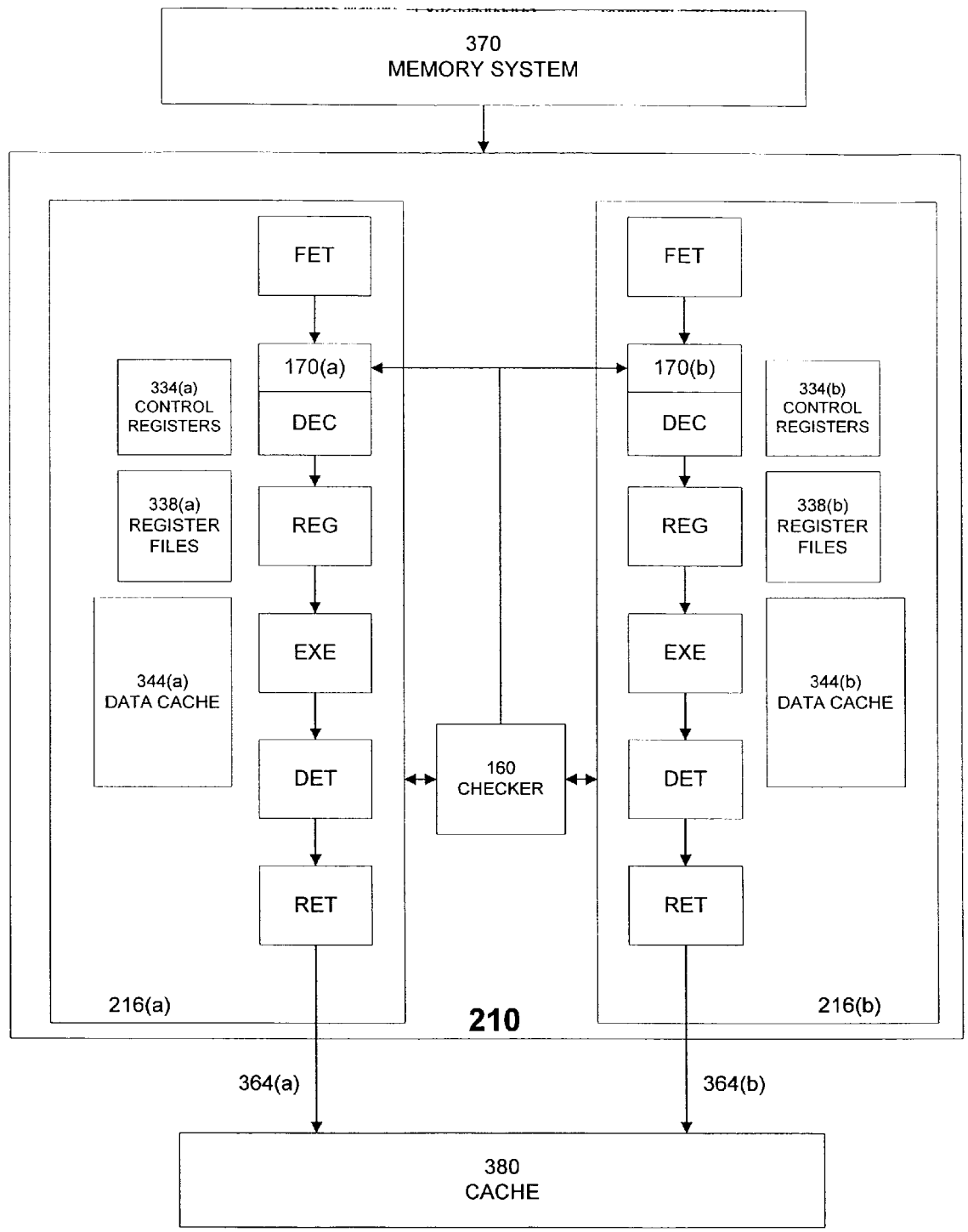
FIG. 3 is a more detailed block diagram of one embodiment of the processor shown in FIG. 2A.

FIG. 3 represents in greater detail one embodiment of processor 210. For the disclosed embodiment, each execution core 216 is represented as a series of stages in an instruction execution pipeline. Each stage corresponds to one or more operations implemented by execution cores 216 to execute their instructions. Alternatively, the pipeline stages may be understood to represent the logic that executes the indicated operations. Instructions and data are provided to execution cores 216 from a memory system 370. Memory system 370 may represent, for example, main memory 120 and non-volatile memory 130 of FIG. 1. Cache 380 represents a portion of memory system 370 to which results from executed instructions are written. Cache 380 may be located on the same chip as processor 210 or it may be located on a separate chip.

For the disclosed embodiment of processor 210, each execution core 216 is partitioned into a fetch (FET) stage, a decode (DEC) stage, a register (REG) stage, an execute (EXE) stage, a detect (DET) stage, and a retirement (RET) stage. One or more instructions are retrieved from memory system 370 in FET stage. The retrieved instructions are decoded into µops in DEC stage, and source operands specified by the µop(s) are retrieved in REG stage. The µop(s) are executed on the retrieved operands in EXE stage, and any exceptions raised by the µop(s) are signaled in DET stage. The µop(s) is retired in RET stage if no exceptions are detected.

For the disclosed embodiment, results from retired µop(s) are written to cache 380 through retirement channel 364. Because execution cores 216(*a*), 216(*b*) operate redundantly, only one of retirement channels 364 needs to update cache 380. One embodiment of processor 210 may implement a high performance mode in which execution cores 216 operate independently. For this embodiment, both retirement channels 364 are active.

Figure 5:
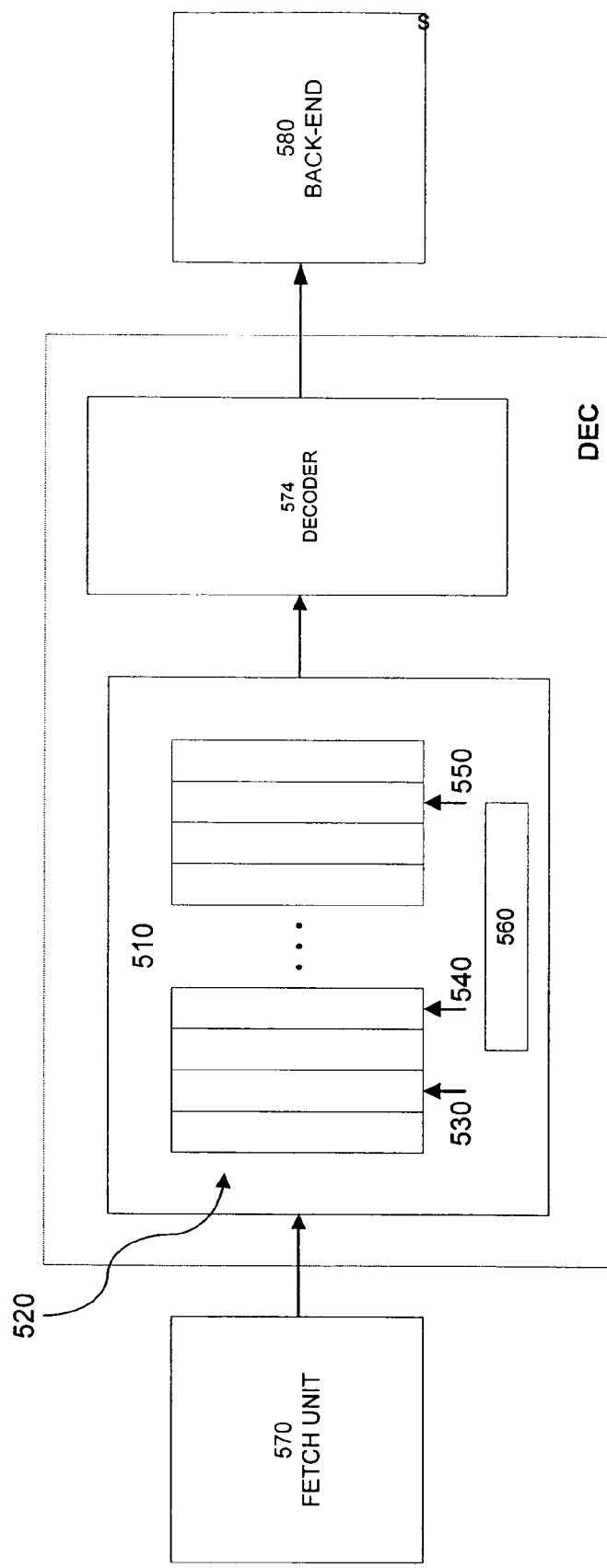
FIG. 5 is a block diagram of one embodiment of a replay unit that may be used to correct soft errors in accordance with the present invention.
Figure 6:
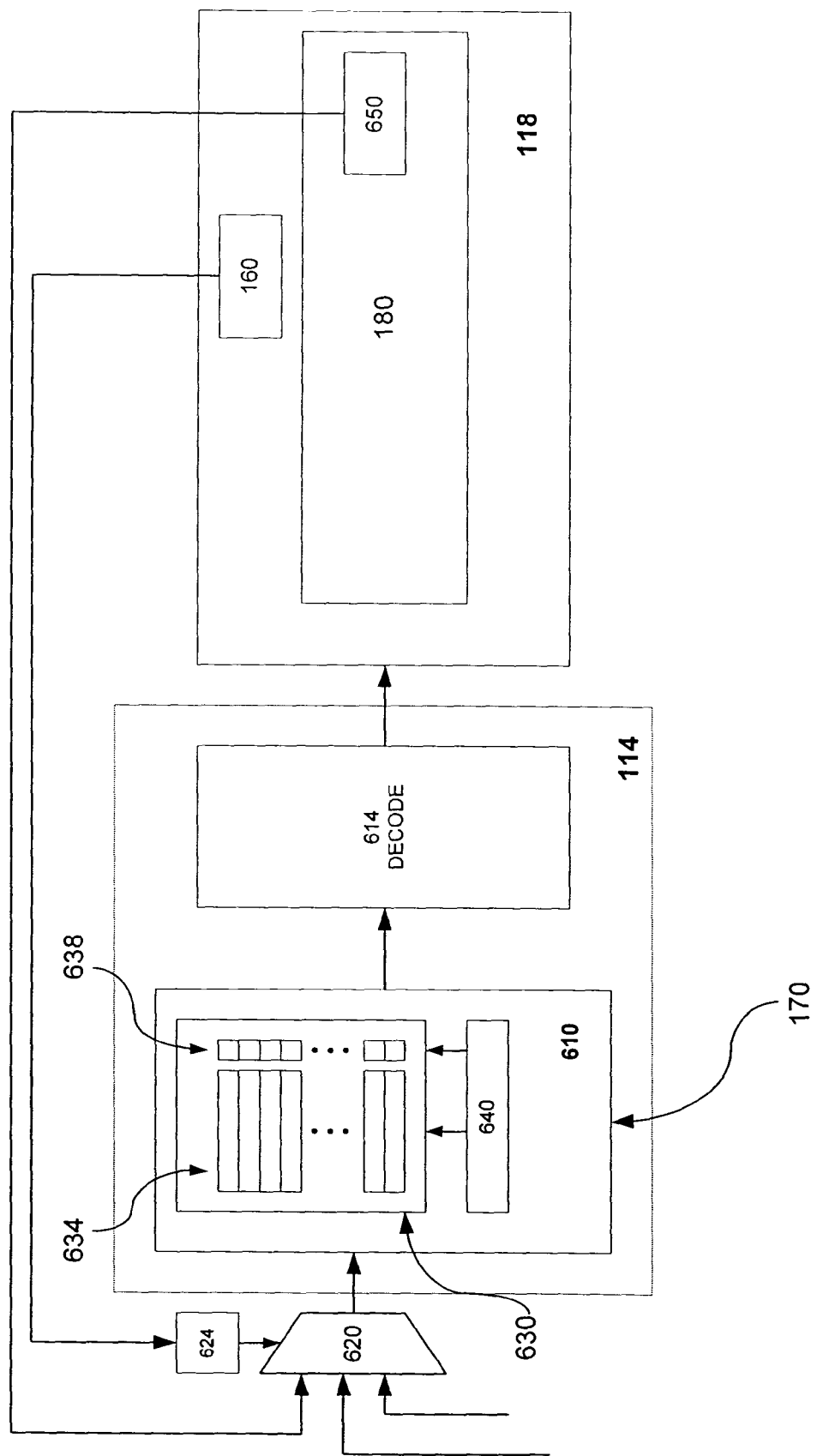
FIG. 6 is a block diagram of another embodiment of a replay unit that may be used to correct soft errors in accordance with the present invention.

For the disclosed embodiment of processor 210, replay unit 170 is represented as part of DEC stage, although it may be incorporated in FET stage for other embodiments (FIG. 6). Replay unit 170 include a buffer (FIG. 5) to temporarily stores fetched instructions and control logic (FIG. 5) to adjust one or more pointers to indicate the status of the stored instructions. Incorporating replay unit 170 in the instruction execution pipelines of processor 210 allows a fast response to any error indication provided by check unit 160. In addition, the buffer of replay unit 170 serves the additional function of decoupling back end stages (REG, EXE, DET, RET) from front end stages (FET, DEC). This allows front-end operations to continue, even if back-end operations are stalled or otherwise delayed. It also allows back-end operations to proceed if front-end operations are delayed.

The present invention does not require partition of processor 100 into a particular set of pipeline stages. For example, a disclosed stage may be subdivided into two or more stages to address timing issues or facilitate higher processor clock speeds. Alternatively, two or more stages may be combined into a single stage. Other embodiments may include hardware for processing instructions out-of-order. The disclosed pipeline provides only one example of how operations may be partitioned in a processor implementing the present invention.

Also shown for each execution core 216 are status/control (S/C) registers 334, data registers 338, and a data cache 344. S/C registers 334 store information that governs the operation of execution core 216. Data registers 338 store operands for use by various resources in execution core 110, and data cache 344 buffers operands between memory system 370 and other resources in execution core 216. Depending on timing constraints, data cache 344 may provide operands to data registers 338 or directly to execution resources in EXE stage 340.

Execution cores 216(*a*) and 216(*b*) are synchronized to operate on identical instructions in lock step to support high reliability execution. One embodiment of processor 210 may provide a high performance (HP) mode in addition to the high reliability (HR) mode. In HP mode, execution cores 216(*a*) and 216(*b*) operate on different instructions. For example, processor 210 may operate as a single chip symmetric multi-processing (SMP) system in HP mode, with each execution core 216 operating as an independent processor core. Dual mode embodiments of processor are described in U.S. patent application Ser. No. 09/470,096, entitled "Microprocessor Having a High Reliability Operating Mode" and filed on even date herewith, and U.S. patent application Ser. No. 09/470.098, entitled "Microprocessor Having a High Reliability Operating Mode" and filed on even date herewith.

Figure 4:
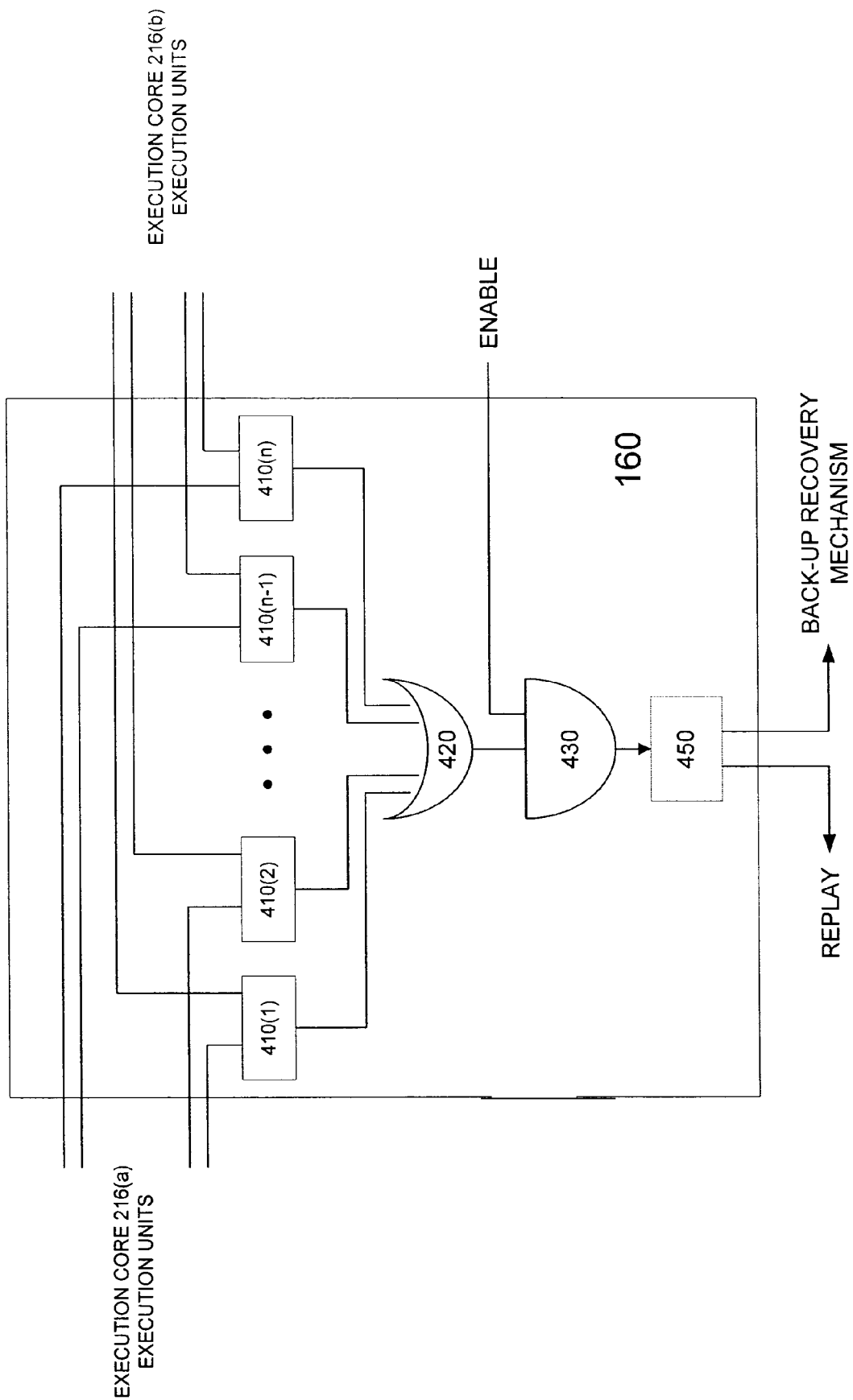
FIG. 4 is a block diagram of one embodiment of the check unit of the processor in FIGS. 2A and 2B.

FIG. 4 is a block diagram representing one embodiment of check unit 160 that is suitable for use with processors 210, 220. The disclosed embodiment of check unit 160 includes "n" comparators 410(1)-410(n), an OR gate 420, and an AND gate 430. A comparator 410 is provided for each execution unit in execution core 216 (FIG. 3). For example, one embodiment of processor 210 may include an integer execution unit (IEU), a floating point execution unit (FPU), a memory execution unit (MEU), and a branch execution unit BRU in the EXE stage of each execution core 216 (FIG. 3). For this embodiment, check unit 160 includes 4 comparators 410. Comparator 410(1), 410(2), 410(3) and 410(4) monitor outputs of the IEUs, FPUs, MEUs, and BRUs, respectively, from execution cores 216(a), 216(b).

For the disclosed embodiment of check unit 160, each comparator 410 generates a logic value zero when the execution results applied to its inputs match and a logic value one when the execution results do not match. For one embodiment of check unit 160, comparators 410 are self check comparators. OR gate 420 generates a logic value one when any of comparators 410 indicates that its corresponding execution results do not match. The output of OR gate 20 indicates an error when AND gate 430 is enabled. This error signal may be used to trigger a flush of the processor's instruction execution pipeline and a re-execution of the appropriate instructions by replay unit. Pipeline flushing operations may be handled through an exception handling unit in the processor (not shown). Mechanisms for flushing processor pipelines are well-known.

For another embodiment of the invention, replay may be initiated in the FET stage of the processor's instruction execution pipeline. For example, when check unit 160 detects an error, an instruction pointer (IP) associated with the instruction currently in the DET stage may be provided to the FET stage. The instructions to be re-executed may then be retrieved from an instruction cache associated with the FET stage. The exception handling unit may provide the resteer address to the FET stage. This embodiment is discussed in greater detail in conjunction with FIG. 6.

As discussed above, one embodiment of processor 210 may be switched between a high reliability (HR) mode, in which execution cores 216 operate in lock step, and a high performance (HP) mode, in which execution cores 216 operate on different instruction segments. The ENABLE input to AND gate 430 allows check unit 160 to be disabled when processor 210 is in HP mode.

Embodiments of check unit 160 may include a counter 450 to track the number of replays triggered on a particular instruction. For example, an embodiment of processor 110 that employs a back-up recovery mechanism may invoke the back-up recovery mechanism after a specified number of re-execution attempts fail to eliminate a discrepancy. For these embodiments, counter 450 may track the replay attempts and invoke a recovery routine when the specified number is reached.

Persons skilled in the art of processor design and having the benefit of this disclosure will recognize other variations on check unit 160 that may be activated to monitor results in execution cores 216.

For the disclosed embodiments of processor 110, check unit 160 compares execution results in the DET stage, to determine whether an error has occurred. When no discrepancy is detected, the corresponding instruction(s) are allowed to retire. The recovery mechanism is implemented when a discrepancy or mismatch between execution results is detected.

The soft errors targeted by the present invention are unlikely to occur in both execution cores simultaneously. Consequently, differences in execution results detected by check unit 160, in the absence of errors originating in parity/ECC protected arrays, are most likely due to soft errors in the circuitry of execution cores 216. Since these errors occur relatively infrequently, they may be corrected by flushing "in-flight" instructions from the execution cores/clusters (or portions thereof) and re-executing the flushed instructions, beginning with the instruction that triggered the error.

For one embodiment of the invention, the replay unit tracks each instruction until it is successfully retired. If an error (mismatch between execution results) is detected for the instruction in DET stage, each execution core or a portion of it may be resteered to reexecute selected instructions, beginning with the instruction currently in DET stage.

FIG. 5 is a block diagram of one embodiment of replay unit 170 and associated logic. The disclosed embodiment of replay unit 170 includes multiple slots 520 to store fetched instructions, pointers 530, 540, 550 to track the status of the stored instructions, and control logic 560 to manage pointers 530, 540, 550. For the disclosed embodiment, a fetch unit 570 provides an instruction (or instruction bundle) to an available slot 520. The stored instruction(s) is decoded into one or more µops by a decoder 574 and issued to a back end 580 of the processor pipeline. Back end 580 may include, for example, circuitry associated with the REG, EXE, DET, and RET stages of execution cores 216.

For an alternate embodiment of replay unit 170, decoder 574 may operate on instructions before they are stored in slots 520. For yet another embodiment, fetch unit 570 may provide instruction bundles to replay unit 170, which are then mapped to specific execution units by decoder 574. The extent of DEC stage for the embodiment of processor 210 is indicated in the figure.

Control unit 560 updates pointers 530, 540, 550 as new µops are transferred to queue 510, issued to back-end 580, and retired, respectively. For other embodiments, the relative location of replay unit 170 and decoder 514 may be reversed, in which case replay unit 170 stores µops decoded from fetched instructions. In the following discussion, "instruction" and "µop" are used interchangeably.

For the disclosed embodiment of processor 210, replay unit 170 may be incorporated in the logic associated with DEC stage (FIG. 4) and back-end 580 includes logic associated with REG, EXE, DET, and RET stages. Pointers 530, 540, 550 are updated as instructions are received from FET stage, transferred to REG stage, and retired in RET stage, respectively. For this embodiment, pointer 530 ("head pointer") indicates the latest instruction(s) to enter queue 510, pointer 540 ("tail pointer") indicates the next instruction(s) to be issued to the REG stage, and pointer 550 indicates the next instruction to be retired ("replay pointer") from RET stage. At a given time, the instructions in the slots that follow tail pointer 540, up to and including the instruction(s) indicated by replay pointer 550, are being executed ("in-flight") in back-end 580. Head pointer 530 is updated when a new instruction enters REG stage, tail pointer 540 is updated when a new instruction enters replay unit 170 from instruction cache 570, and replay pointer 550 is updated when the instruction to which it currently points enters RET stage.

When the disclosed embodiment of processor 110 is operating in redundant mode, check unit 160 signals an error and flushes the back end pipe stages if it detects discrepancy between the execution results in the DET stages of execution cores 216(a) and 216(b). When control unit 560 detects the error signal, it adjusts tail pointer 530 to indicate the slot currently indicated by replay pointer 550. This effectively reschedules all un-retired instructions that are currently in the back end of the pipeline for (re)issue to the REG stage. For one execution core/cluster, the instruction(s) indicated by replay pointer 550 is the source of the erroneous execution result, and the instruction(s) in the slots between head pointer 530 and replay pointer 550 follow this error-generating instruction in the back-end of the pipeline. All of these instruction(s) may be flushed from the back end of the pipeline, and reissued by replay unit 170, beginning with the instruction(s) that triggered the error.

Another embodiment of replay unit 170 tracks dependencies between instructions in addition to their status in backend 580. This embodiment of replay unit 170 flushes and replays only the instructions that triggered the error and the issued μops that depend on it ("partial replay").

Yet another embodiment of replay unit 170 employs a shift register, which physically shifts instruction(s) down the queue 510 as earlier instruction(s) are retired. In this embodiment, the oldest, unretired instruction(s) is at the end of queue 510, and a separate replay pointer is not needed. As in the above embodiments, head pointer 530 indicates the next instruction to issue to the back end and tail pointer 540 indicates the last instruction to enter queue 510.

FIG. 6 is a block diagram of an embodiment of a processor 600 in which re-execution is controlled through a fetch unit 610 of a processor's instructions execution pipeline. For the disclosed embodiment, front end 114 includes fetch unit 610 and decode unit 614, and back end 118 includes protected execution unit 180 and check unit 160. In addition, an exception handling unit 650 is shown as part of protected execution unit 180.

An IP selection MUX 620 receives IPs from various sources in the instruction execution pipeline. An associated selection logic 624 receives control signals from various sources in the pipeline, prioritizes them, and selects an IP to forward to fetch unit 610 according to the prioritized signals. One of the signals provided to selection logic 624 is a resteer signal from check unit 160. Other components may be provided by, e.g., branch execution units, exception unit 650, and various other components of processor 600 that can alter the instruction flow through the pipeline. Each IP provided at the output of MUX 620 may point to a single instruction or a bundle of instructions, depending on the particular embodiment of processor 600.

For the disclosed embodiment, fetch unit 610 includes an instruction cache 630 and control logic 640. Instruction cache 630 includes instruction entries 634 to store instructions for processing and status entries 638 to indicate the status of the various instructions. For the present invention, status entries indicate when a corresponding instruction in one of entries 634 may be evicted from cache 630. For one embodiment of the present invention, control logic 640 receives an indication from exception unit 650 when an instruction retires, and indicates in the appropriate status entry 638 that the instruction in the corresponding entry 634 may be replaced. Control logic 640 may employ various criteria for replacing instructions in cache 630 in addition to whether the instruction has retired. For a preferred embodiment of fetch unit 610, no instruction is considered available for retirement until it has been retired.

When MUX 620 selects an IP for processing, control logic 640 reads the selected instruction out of an appropriate entry 634 in cache 630 and forwards it to decode unit 614. Decode unit 614 issues the instruction to an appropriate execution unit in protected execution unit 180. Check unit 160 monitors protected execution unit 180 for any errors. If an error is detected, exception unit 650 indicates a resteer IP to MUX 620 and check unit 160 triggers MUX 620 to select the IP provided by exception unit 650. In this way, the instruction corresponding to the resteer IP and the instructions that follow it in execution order are run through the instruction execution pipeline again.

Replay unit 170 provides a relatively efficient hardware mechanism for correcting soft errors associated with logic, latches, and other storage locations in execution cores 216. It eliminates the need for providing parity protection for these locations. As noted above, soft errors in certain storage resources can not be corrected by replay unit 170. For example, when a soft error corrupts an operand in one of the data register files, re-executing instructions on the corrupted input data will not alleviate the mismatch between instruction results generated with the corrupted and uncorrupted data. For these and similar errors that can not be corrected through replay, a fall back error correction mechanism may be provided.

One approach to these errors is to provide ECC protection for the storage structures. This is typically done for certain caches, and it allows parity errors to be detected or corrected on the fly. Corrupted data is detected and corrected before it generates mismatches in execution results. Providing ECC protection for all such storage structures is very costly in terms of silicon die area. Another approach is to provide parity protection. This allows corrupted data to be identified relatively quickly. Since these errors are not corrected through replay, another mechanism is provided for this purpose.

For one embodiment of computer system 100, a recovery routine is provided through non-volatile memory 130. Check unit 160 may trigger a machine check that invokes a firmwarebased error handling routine. For this embodiment, processor 110 may access an error handling routine when check unit 160 signals an error and replay unit 170 fails to correct it after a specified number of tries. One embodiment of a firmware recovery mechanism operates in conjunction with parity protected storage locations. When replay fails to correct a mismatch in execution results, a recovery routine is implemented to read parity bits associated with the storage structures to locate the error. The storage location that produces the error may be updated with data from the execution core that does not display any parity errors. A firmware based mechanism for processing soft errors is described in U.S. patent application Ser. No. 09/469,963, entitled "Firmware Mechanism for Correcting Soft Errors" and filed on even date herewith.

There has thus been provided processor including a hardware-based mechanism for correcting soft errors. The processor includes a protected execution unit, a check unit, and a replay unit. The protected execution unit is designed to facilitate detection of soft errors. The check unit monitors the protected execution unit for indications of soft errors and signal the replay unit when an error is indicated. The replay unit issues instructions to the protected execution unit and temporarily stores an indication of the issued instructions while they are in-flight. If an error is indicated, the replay unit reissues selected instructions for reexecution.

For soft errors in longer term storage structures, e.g. register files, low level caches and the like, corrupted data is only by regenerating the original data. This may be done through ECC mechanisms or through a separate error recovery routine. These errors may be identified by replaying instructions and rechecking the instruction results for mismatch. If the mismatch persist through replay, it is likely attributable to corrupted data, and a firmware recovery mechanism may be implemented.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. A processor comprising:
    an execution unit including
        a first parity-protected storage structure having a first parity bit and
        a second parity-protected storage structure having a second parity bit;
        a check unit coupled to the first parity-protected storage structure and the second parity-protected storage structure, the check unit to monitor the first parity-protected storage structure and the second parity-protected storage structure, to detect a parity error in data accessed from the first parity-protected storage structure or in data accessed from the second parity-protected storage structure, and to signal a parity error; and
        a replay queue coupled to the check unit and the execution unit, the at least one replay queue to issue a plurality of instructions to the protected execution unit for processing, to track the plurality of instructions issued to the protected execution unit, and to selectively reissue one or more of the plurality of instructions to the protected execution unit in response to the check unit detecting and signaling a parity error.

2. The processor of claim 1, wherein
    a parity error indicates a soft error corrupted data after it was stored into the first parity-protected storage structure or the second parity-protected storage structure.

3. The processor of claim 1, wherein
    the first parity-protected storage structure is a register file to store a first plurality of data blocks each of which has a first parity bit, and
    the second parity-protected storage structure is a cache to store a second plurality of data blocks each of which has a second parity bit.

4. A processor comprising:
    an execution unit including
        a first protected storage structure having a first plurality of error correction control bits;
        a second protected storage structure having a second plurality of error correction control bits;
        a check unit coupled to the first parity-protected storage structure and the second parity-protected storage structure, the check unit to monitor the first protected storage structure and the second protected storage structure, to detect an error in data accessed from the first protected storage structure or in data accessed from the second protected storage structure, and to correct the error in the accessed data in response to the first or second plurality of error correction control bits, respectively; and
        a replay queue coupled to the check unit and the execution unit, the at least one replay queue to issue a plurality of instructions to the protected execution unit for processing, to track the plurality of instructions issued to the protected execution unit, and to selectively reissue one or more of the plurality of instructions to the protected execution unit in response to the check unit detecting an error in instruction execution.

5. The processor of claim 4, wherein
    the first protected storage structure is a register file to store a first plurality of data blocks each of which has a first plurality of error correction bits, and
    the second protected storage structure is a cache to store a second plurality of data blocks each of which has a second plurality of error correction bits.

* * * * *